US007103642B1

(12) United States Patent
Chen et al.

(10) Patent No.: US 7,103,642 B1
(45) Date of Patent: Sep. 5, 2006

(54) SYSTEM AND METHOD FOR PERSONALIZING A HOME PAGE

(75) Inventors: Reynold J. Chen, Leawood, KS (US); Mir Islam, Kansas City, MO (US); James F. Byrne, Jr., Leavenworth, KS (US); Van F. Lett, Lawrence, KS (US); Tim D. Euler, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 652 days.

(21) Appl. No.: 10/135,605

(22) Filed: Apr. 30, 2002

(51) Int. Cl.
*G06F 15/16* (2006.01)
(52) U.S. Cl. ................ 709/218; 709/247
(58) Field of Classification Search ........ 709/204, 709/206, 203, 213, 218, 219, 224, 226, 217, 709/247; 707/102, 513, 514; 705/2, 30, 705/51; 715/804, 838
See application file for complete search history.

(56) References Cited

U.S. PATENT DOCUMENTS

| | | | |
|---|---|---|---|
| 5,491,795 A * | 2/1996 | Beaudet et al. ............ 715/804 |
| 5,848,410 A * | 12/1998 | Walls et al. ................ 707/4 |
| 5,854,897 A * | 12/1998 | Radziewicz et al. ........ 709/224 |
| 6,016,494 A * | 1/2000 | Isensee et al. ............ 707/102 |
| 6,085,229 A * | 7/2000 | Newman et al. ............ 709/203 |
| 6,138,159 A * | 10/2000 | Phaal ........................ 709/226 |
| 6,237,030 B1 * | 5/2001 | Adams et al. .............. 709/218 |
| 6,313,855 B1 * | 11/2001 | Shuping et al. ............ 715/854 |
| 6,396,517 B1 * | 5/2002 | Beck et al. ................ 715/771 |
| 6,456,307 B1 * | 9/2002 | Bates et al. ............... 715/838 |
| 6,523,022 B1 * | 2/2003 | Hobbs ........................ 707/3 |
| 6,572,662 B1 * | 6/2003 | Manohar et al. ........... 715/526 |
| 6,613,100 B1 * | 9/2003 | Miller ........................ 715/526 |
| 6,636,238 B1 * | 10/2003 | Amir et al. ................ 715/730 |
| 6,760,746 B1 * | 7/2004 | Schneider .................. 709/203 |
| 6,769,010 B1 * | 7/2004 | Knapp et al. .............. 709/203 |
| 6,795,830 B1 * | 9/2004 | Banerjee et al. ........... 707/200 |
| 6,847,897 B1 * | 1/2005 | Bassett et al. ............. 702/19 |
| 6,868,439 B1 * | 3/2005 | Basu et al. ................ 709/213 |
| 6,879,994 B1 * | 4/2005 | Matsliach et al. .......... 709/204 |
| 6,895,387 B1 * | 5/2005 | Roberts et al. ............. 705/14 |
| 6,904,449 B1 * | 6/2005 | Quinones .................. 709/203 |
| 2001/0027493 A1 * | 10/2001 | Wallace .................... 709/247 |
| 2001/0029475 A1 * | 10/2001 | Boicourt et al. ........... 705/30 |
| 2001/0054020 A1 * | 12/2001 | Barth et al. ............... 705/37 |

(Continued)

OTHER PUBLICATIONS

Continual Queries for Internet Scale Event-Driven Information . . . -Liu (1999) www.cse.ogi.edu/~lingliu/Papers/final-tkde99.ps.*

(Continued)

*Primary Examiner*—Thong Vu (57) ABSTRACT

Generally described, a method and system of customizing and personalizing a home page are provided. The method includes means for defining the appearance, layout and behavior of a network computing environment home page upon access by a user. The method also provides for increased portability of a user experience from one computing access environment to another. A centralized hub of relevant information resources is provided to make users more productive through ease of access and automatic delivery of time-sensitive information. Accordingly, users can integrate sources of pertinent information into their daily routines, essentially creating "personal channels".

12 Claims, 9 Drawing Sheets

U.S. PATENT DOCUMENTS

| | | | |
|---|---|---|---|
| 2002/0052934 A1* | 5/2002 | Doherty | 709/219 |
| 2002/0053084 A1* | 5/2002 | Escobar et al. | 725/47 |
| 2002/0054090 A1* | 5/2002 | Silva et al. | 345/747 |
| 2002/0073149 A1* | 6/2002 | Young | 709/204 |
| 2002/0138331 A1* | 9/2002 | Hosea et al. | 705/10 |
| 2002/0156787 A1* | 10/2002 | Jameson et al. | 707/10 |
| 2002/0184111 A1* | 12/2002 | Swanson | 705/26 |
| 2003/0028399 A1* | 2/2003 | Davis et al. | 705/2 |
| 2003/0031096 A1* | 2/2003 | Nathan et al. | 369/30.03 |
| 2003/0167234 A1* | 9/2003 | Bodmer et al. | 705/51 |
| 2004/0039795 A1* | 2/2004 | Percival | 709/218 |

OTHER PUBLICATIONS

Sequencing Run-Time Reconfigured Hardware with Software—Wirthlin (1996) splish.ee.byu.edu/docs/fpga96_final.ps.gz.*

TrIAs—An Architecture for Trainable Information Assistants13 Bauer, Dengler (1998) www.dfki.de/~bauer/aaai-ws-10.ps.*

Do You Have the Time? Composition and Linking in . . . -Hardman, van.. (1999) www.cwi.nl/multimedia/publications/ht99-time.ps.gz.*

* cited by examiner

SYSTEM AND METHOD FOR PERSONALIZING A HOME PAGE

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

The present invention relates generally to computer software. More particularly, the present invention relates to a system and method for customizing and personalizing a home page in a network computing environment, such as the Internet.

Generally, a user accesses a network, or other software application, from an entry point such as a main menu or starting page. In the case of the Internet, this starting page generally is referred to as a "home page". In this context, a "home page" is a browser compatible file or Uniform Resource Locator (URL) address, that is displayed upon initiation of the browser by a user. In other words, the home page is the starting point for a user's network browsing experience and provides users with the ability to connect to any application, from any device, over any network connection.

Traditionally, a home page is designed, populated and provided by an entity other than the individual user. Such home page providers typically include Internet Service Providers (ISPs), business organizations (e.g., the user's place of employment), or one of various portal services, such as America On Line (AOL) or Yahoo. Home pages provided by such entities generally are uniform among users and restrict connection to those applications or web sites particularly selected by the providing ISP, portal, or business. As such, while the user has some ability to personalize their home page, this ability is limited.

As the world of business moves into the global electronic marketplace, organizations require advanced automated business content management systems to enhance productivity and improve their operations by empowering their personnel to quickly access information. While the need for personal access to information varies for an individual user, the end result remains the same. Regardless of whether network use is business or personal, users require a system and method that permits the customization of their "window" to the world of information. In other words, users are increasingly in need of a system and method for personalizing their home page to allow faster, easier access to information.

Existing modes of personalization, in the context of a web browser, permit users to quickly access previously designated URLs in order to open web sites of interest. Depending upon the particular browser being used, these collections of previously designated sites are referred to as "favorites" or "bookmarks". In either case, to access a particular pre-designated web site, a user selects an identifier for the site, typically from a listing or grouping of names or icons. Subsequently, the browser window being displayed is replaced with an information page associated with the newly selected site. The exchange is site for site and extra effort is required if the user desires to have multiple sites or windows displayed simultaneously.

From sports to stock quotes, weather forecasts to directions, people turn to the Internet to research new ideas and/or stay informed about the world around them. Portals and content managed home pages permit increased access and consolidation of topical information so as to attract more users. As previously noted, various sources of information are consulted by a typical individual, thus it has become critical that each of these information sources be brought together in one cohesive and convenient manner regardless of where they are located and without some artificial limitation that is imposed by the portal, ISP, or other provider organization. More importantly, the ability for individuals to customize this environment to suit their needs, thus enabling focused and more efficient utilization of a browser or other method of information access, has taken on increased significance.

Accordingly, a system and method are needed which do more than simply improve the way information is accessed but which also revolutionize the way that people work. More particularly, a system and method which permits increased home page customization is needed. Further, a system and method are needed which facilitate more efficient access to multiple applications from a user's home page.

SUMMARY OF THE INVENTION

Accordingly, the present invention provides a method in a computing environment for personalizing access to information on a network. The method includes providing, on a network home page, access to one or more individual links. Each individual link provides a connection to an information page which is accessible from the network. Further, each individual link is defined by a user. The method of the present invention additionally includes displaying, simultaneously with the home page, a series of windows. Each window in the series displays the information page which corresponds to one of the defined individual links. In a preferred embodiment, the method of the present invention additionally includes providing one or more groups of links, each group containing at least one of the individual links. In this embodiment, the series of windows displayed with the home page corresponds to the individual links contained within a particular group. The groups also are defined by the user.

The present invention further provides a method in a computing environment for facilitating access to information on a network which includes permitting a user to select one or more Uniform Resource Locators (URLs), each URL corresponding to an information page on the network. The method further provides for the simultaneous launching of the information page which corresponds with each URL selected.

Still further, the present invention provides a method in a computing environment for personalizing a home page on a network, the personalized home page being remotely accessible by a user. The method includes providing a home page having a user configurable area, storing one or more individual links defined by the user, populating the configurable area with a set of indicia upon initiation of the home page from a network accessible device, and displaying, simultaneously with the home page, a series of windows. Each individual link provides access to an information page accessible from the network and each window in the series displays the information page which corresponds to one of the individual links. In a preferred embodiment, the method further includes storing one or more groups of links, each group containing at least one of the individual links. Each group is defined by a user and the series of windows displayed with the home page corresponds to the individual links contained in one of the groups.

The present invention additionally provides a system for use in a computing environment for personalizing access to information on a network. The system includes a home page having an area which is configurable by a user and one or more individual links. Each individual link provides a connection to an information page which is accessible from the network and each individual link is defined by the user. A series of windows is displayed simultaneously with the home page, each window containing the information page which corresponds to one of the individual links. In the preferred embodiment, the system further includes one or more groups of links, each group containing at least one of the individual links. Each group is defined by the user and the series of windows displayed with the home page corresponds to the individual links contained in one of the groups.

Additional aspects of the invention, together with the advantages and novel features appurtenant thereto, will be set forth in part in the description which follows, and in part will become apparent to those skilled in the art upon examination of the following, or may be learned from the practice of the invention. The aspects and advantages of the invention may be realized and attained by means, instrumentalities and combinations particularly pointed out in the appended claims.

BRIEF DESCRIPTION OF THE SEVERAL VIEWS OF THE DRAWINGS

In the accompanying drawings which form a part of the specification and are to be read in conjunction therewith, and in which like reference numerals are employed to indicate like parts in the various figures.

DETAILED DESCRIPTION OF THE INVENTION

The present invention is directed to a system and method for customizing and personalizing a network computing environment home page. The system and method defines the appearance, layout and behavior of a home page upon access by a user of a network computing environment, such as the Internet. The particular embodiments described herein are intended in all respects to be illustrative rather than restrictive. Alternative embodiments will become apparent to those skilled in the art to which the present invention pertains without departing from its scope.

Exemplary Operating Environment

Figure 1:
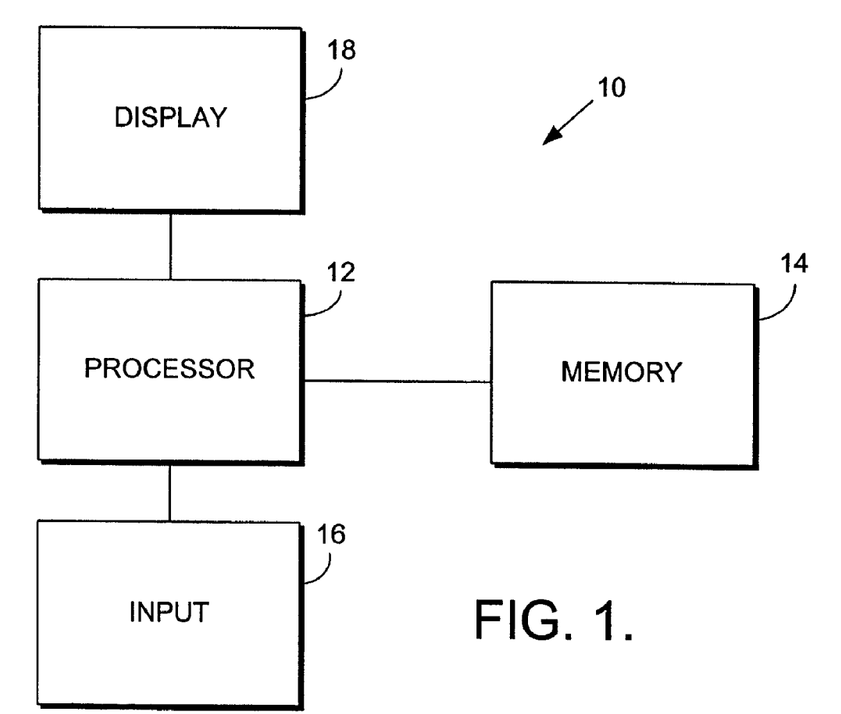
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 10. In its most basic configuration, operating environment 10 typically includes a processor 12 and a memory 14. Depending upon the exact configuration and type of operating environment, memory 14 may be volatile (e.g., random access memory (RAM)), non-volatile (e.g., read only memory (ROM), flash memory, etc.) or some combination of volatile and non-volatile memory. Additionally, operating environment 10 also may have mass storage (removable and/or non-removable) such as magnetic tape, magnetic disks, and/or optical disks. The operating environment 10 further typically includes an operating system which is resident on the memory 14 and executes on the processor 12.

Operating environment 10 also may include an input 16 and/or an output, such as a display 18. Merely by way of illustration and not restriction, input 16 may be any one of a variety of inputs known in the art, or any combination thereof, such as a keypad, mouse, pen, voice input device, touch input device, and the like. Similarly, output 18 may be any one or a combination of a variety of outputs known in the art such as a display, speakers, printer, and the like. All such devices are well known in the art and need not be discussed at length herein. It will be understood and appreciated that various inputs or outputs may be utilized with the operating environment of the present invention and such variations are contemplated to be within the scope hereof.

Figure 2:
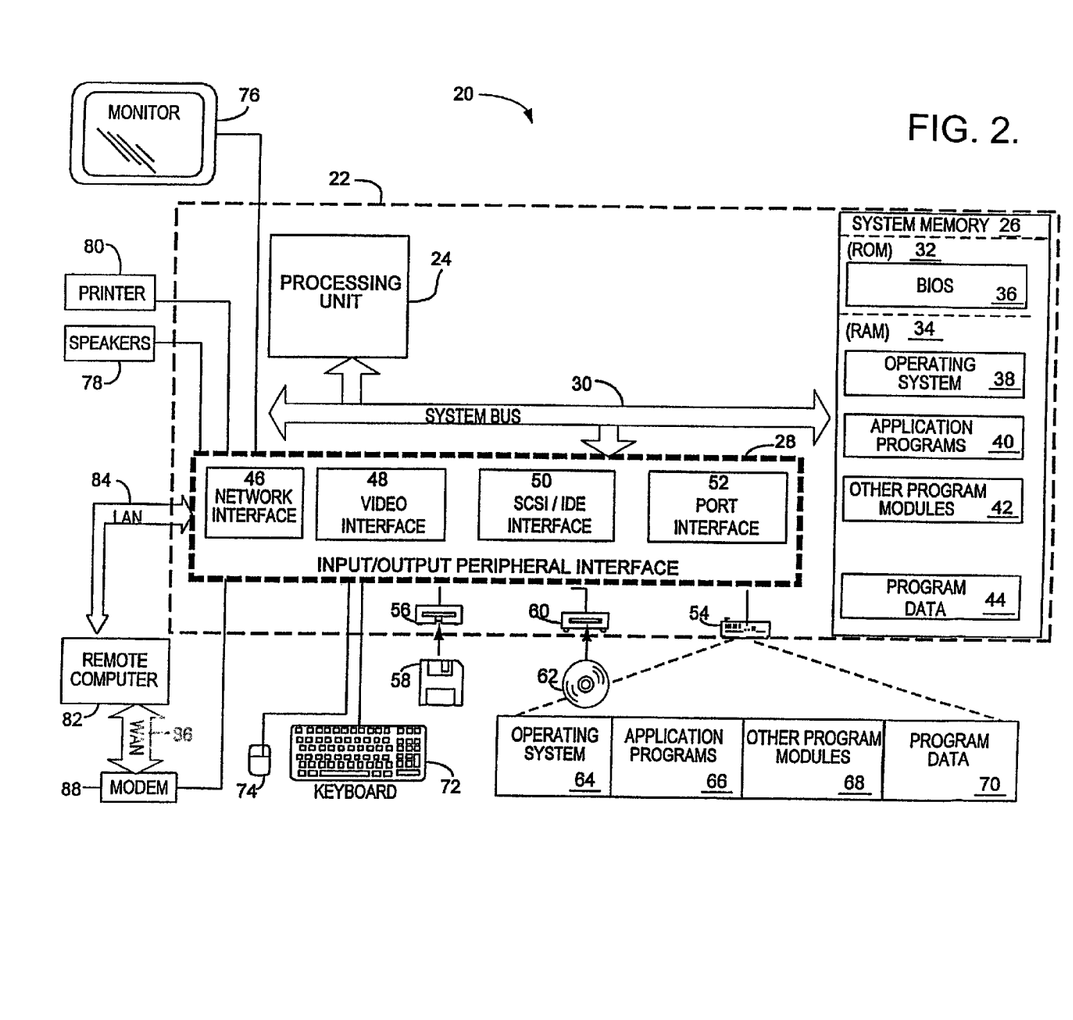
FIG. 2 is a more detailed block diagram of a computing system suitable for use in implementing the present invention.

In greater detail, FIG. 2 illustrates an example of a suitable operating environment 20 on which the present invention may be implemented. Operating environment 20 is a computing system environment and is merely one example of a suitable operating environment. Computing system environment 20 is not intended to suggest any limitation as to the scope of use or functionality of the present invention. Further, computing system environment 20 should not be interpreted as having any dependency or requirement relating to any one of the components, or any combination thereof, illustrated in the exemplary computing environment 20.

The present invention may be described in the general context of computer-executable instructions, such as program modules, being executed by a computer. Generally, program modules include routines, programs, objects, components, data structures, and the like, that perform particular tasks or implement particular abstract data types. Moreover, those skilled in the art will appreciate that the present invention is operational with a variety of additional general purpose or special purpose computing systems, environments, and/or configurations. Examples of well known computing systems, environments, and/or configurations that may be suitable for use with the present invention include, but are not limited to, personal computers, server computers, hand-held or laptop devices, multiprocessor systems, microprocessor-based systems, programmable consumer electronics, network PCs, minicomputers, mainframe computers, and the like. The invention also may be practiced in distributed computing environments wherein tasks are performed by remote processing devices that are linked through a communications network. In a distributed computing environment, program modules may be located in both local and remote computer storage media including memory storage devices.

With reference to FIG. 2, an exemplary system for implementing the present invention includes a general purpose computing device in the form of a computer 22. Components of computer 22 include, but are not limited to, a central processing unit (CPU) 24, a system memory 26, an input/output (I/O) Interface 28, and a system bus 30 that couples various system components with one another, including coupling the system memory with the processing unit. The system bus 30 may be any of several types of bus structures including a memory bus or memory controller, a peripheral bus, and a local bus using any of a variety of bus architectures. By way of example, and not restriction, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 22 typically includes a variety of computer readable media. By way of example, and not restriction, computer readable media may comprise computer storage media and communication media. Computer storage media includes both volatile and nonvolatile storage media, and removable and non-removable storage media, each implemented in any method or technology for storage of information such as computer readable instructions, data structures, program modules or other data. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 22.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not restriction, communication media includes wired media such as a wired network or direct wired connection, and wireless media such as acoustic, RF, infrared and other wireless media. It will be understood and appreciated that combinations of any of the above also are included within the scope of computer readable media.

The system memory 26 includes computer storage media in the form of volatile and/or nonvolatile memory such as ROM 32 (nonvolatile) and RAM 34 (volatile). A basic input/output system (BIOS) 36, containing the basic routines that help to transfer information between elements within computer 22, such as during start-up, is typically stored in ROM 32. RAM 34 typically contains data and/or program modules that are presently being operated on by processing unit 24, and/or are immediately accessible to the processing unit. By way of example, and not restriction, FIG. 2 illustrates operating system 38, application programs 40, other program modules 42, and program data 44 as data and/or program modules stored in RAM 34.

The I/O Interface 28 includes a variety of components that provide physical connections and communications between peripheral devices and the processing unit 24, system bus 30 and system memory 26 of computer 22. By way of example only, I/O Interface 28 may include network interface 46, video interface 48, Small Computer System Interface (SCSI) or Integrated Device Electronics(IDE) Interface 50, or other mass storage-type interface, and serial, parallel, USB, or other bus-type port interface 52. As would be understood and appreciated by those of skill in the art, I/O Interface 28 may include interface components that are integrated, provided as an add-on hardware device, provided as a software component or a combination of software and hardware. All such variations are contemplated to be within the scope hereof.

The computer 22 also may include other computer storage media which may be removable and/or nonremovable, volatile and/or nonvolatile. By way of example only, FIG. 2 illustrates other computer storage media as a hard disk drive 54, a magnetic disk drive 56 and an optical disk drive 60. Hard disk drive 54 reads from and/or writes to nonremovable, nonvolatile magnetic media. Magnetic disk drive 56 reads from and/or writes to a removable, nonvolatile magnetic disk 58. Optical disk drive 60 reads from or writes to a removable, nonvolatile optical disk 62 such as a CD ROM, DVD or other optical media. By way of example, and not restriction, other removable/nonremovable, volatile/nonvolatile computer storage media that can be used in the exemplary operating environment include magnetic tape cassettes, flash memory cards, digital video tape, Bernoulli cartridges, solid state RAM, solid state ROM, and the like. Computer storage media typically is connected to the system bus 30 through I/O Interface 28. Various types of I/O interfaces may be used in the exemplary operating environment 20 and are known to those of skill in the art. For instance, the hard disk drive 54, magnetic disk drive 56, and optical disk drive 60 may be connected to the system bus 30 by a SCSI or IDE Interface 50. It will be understood and appreciated that the above interfaces are merely examples of interfaces that may be suitable for the exemplary computing system 20 and should not be viewed as limitations of the present invention.

The drives and their associated computer storage media discussed above and illustrated in FIG. 2, provide storage of computer readable instructions, data structures, program modules and other data for the computer 22. In FIG. 2, for example, hard disk drive 54 is illustrated as storing operating system 64, application programs 66, other program modules 68, and program data 70. Note that these components either can be the same as or different from operating system 38, application programs 40, other program modules 42, and program data 44. Typically, the operating system, application programs and the like that are stored in RAM are portions of the corresponding systems, programs, or data read from hard disk drive 54, the portions varying in size and scope depending on the functions desired. Operating system 64, application programs 66, other program modules 68, and program data 70 are given different numbers herein to illustrate that, at a minimum, they are different copies.

A user may enter commands and information into the computer 22 through input devices such as a keyboard 72 and pointing device 74, commonly referred to as a mouse, trackball or touch pad. Other input devices (not shown) may include a microphone, joystick, game pad, satellite dish, scanner, or the like. These and other input devices often are connected to the processing unit 24, generally through I/O Interface 28 that is coupled to the system bus 30, more particularly through port interface 52. As previously discussed, input devices may be connected by interface components and bus structures, such as a parallel port, game port or a universal serial bus (USB) port. A monitor 76 or other type of display device also is connected to system bus 30 via an interface such as I/O Interface 28. In addition to the monitor, computers also may include other peripheral output devices such as speakers 78 and printer 80, which also may be connected through I/O interface 28. By way of example only, a typical I/O interface for an output peripheral device such as monitor 76 is a video interface 48.

The computer 22 in the present invention is capable of operating in a networked environment using logical connections to one or more remote computers, such as remote computer 82. The remote computer 82 may be a personal computer, a server, a router, a network PC, a peer device or other common network node, and typically includes many or all of the elements described above relative to the computer 22. The logical connections depicted in FIG. 2 include a local area network (LAN) 84 and a wide area network (WAN) 86, but may also include other networks. Such networking environments are commonplace in offices, enterprise-wide computer networks, intranets and the Internet.

When used in a LAN networking environment, the computer 22 is connected to the LAN 84 through a network interface 46 or adapter card. When used in a WAN networking environment, the computer 22 typically includes a modem 88 or other means for establishing communications to the WAN 86, such as the Internet. The modem 88, which may be internal or external, may be connected to the system bus 30 via the I/O Interface 28, or other appropriate mechanism. It will be understood and appreciated by those of skill in the art that the network connections shown are exemplary and other means of establishing a communications link between the computers may be used.

Although many other internal components of the computer 22 are not shown, those of ordinary skill in the art will appreciate that such components and the interconnection are well known. Accordingly, additional details concerning the internal construction of the computer 22 need not be disclosed in connection with the present invention.

When the computer 22 is turned on or reset, the BIOS 36, which is stored in the ROM 32 instructs the processing unit 24 to load the operating system, or necessary portion thereof, from the hard disk drive 54 into the RAM 34. Once the copied portion of the operating system, designated as operating system 38, is loaded in RAM 34, the processing unit 24 executes the operating system code and causes the visual elements associated with the user interface of the operating system 38 to be displayed on the monitor 76. Typically, when an application program 66 is opened by a user, the program code and relevant data are read from the hard disk drive 54 and the necessary portions are copied into RAM 34, the copied portion represented herein by reference numeral 40.

Figure 3:
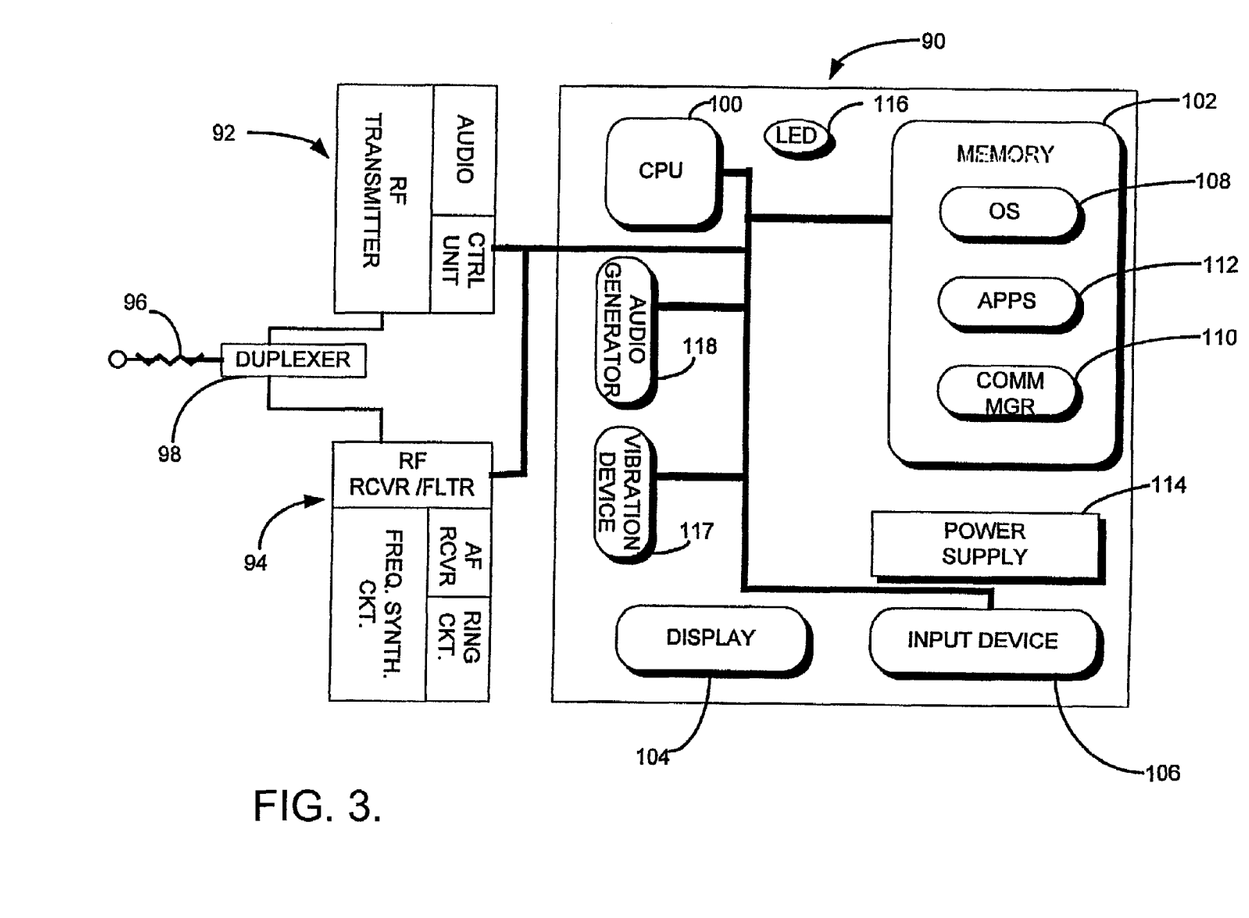
FIG. 3 is a more detailed block diagram of a wireless system suitable for use in implementing the present invention.

FIG. 3 illustrates an alternative suitable computing environment 90 on which the invention may be implemented. Alternative computing environment 90 is a wireless environment and is merely a second example of a suitable computing environment and is not intended to suggest any limitation as to the scope of use or functionality of the invention. Neither should alternative computing environment 90 be interpreted as having any dependency or requirement relating to any one or combination of components illustrated in the exemplary environment 90.

Wireless environment 90 includes transmission circuitry 92 and receiving circuitry 94 that jointly utilize an antenna 96 through a duplexer 98. Wireless environment 90 further includes several components that are similar to computing environment 20. For instance, similar to computing environment 20, wireless environment 90 generally includes a processor 100, a memory 102, a display 104 and an input 106. The memory 102 may be volatile (e.g., RAM), non-volatile (e.g., ROM, Personal Computer Memory Card International Association (PCMCIA) cards), or some combination of volatile and non-volatile memory. Like computing environment 20, wireless environment 90 typically includes a variety of computer readable media. Examples include, but are not limited to, Programmable Read-Only Memory (PROM) and Erasable Programmable Read-Only Memory (EPROM). The wireless environment 90 further typically includes an operating system 108 which is resident on the memory 102 and executes on the processor 100.

Memory 102 also includes one or more application programs that interact with the operating system 108. Examples of applications include, but are not limited to, email programs, scheduling programs, PIM (personal information management) programs, word processing programs, spreadsheet programs, Internet browser programs and the like. Wireless environment 90 also includes a notification manager 110 loaded in memory 102. The notification manager handles notification requests from application programs 112 and other operating system functions.

Wireless environment 90 further includes a power supply 114 which may be implemented as one or more batteries, such as nickel-cadmium (NiCAD) batteries. The power supply 114 may further include an external power source (not shown) that overrides or recharges the built-in batteries, such as an AC adapter or a powered docking cradle.

Wireless environment 90 is illustrated with three types of external notification mechanisms: an LED 116 or other display, a vibration device 117 and an audio generator 118. These devices are directly coupled to the power supply 114 so that, when activated, they remain on for a duration dictated by the notification mechanism even though the processor 100 and/or other components might be shut down to conserve battery power. The display 104 preferably remains on indefinitely unless and until the user takes action. The vibration device 117 and audio generator 118 may be configured to conserve power by turning off when the rest of the system is off, or at some finite duration after activation.

Within a typical wireless environment 90, radio RF transmitter 92 and radio receiver 94 sections couple transmit and receive functions through a duplexer 98 and an antenna 96. In operation, the processor 100 receives program instructions from memory 102. The wireless environment 90 must receive and transmit a ream of data back and forth to a communications cell site. Signal (e.g., voice/data) is received from a cell site and is filtered and processed to be heard in a speaker. The processor 100 sends data to and from a frequency synthesizer which, after processing this data, sets up the correct transmit and receiver frequencies. The frequency synthesizer within the receiver 94, with instructions from the processor 100 tunes the wireless environment 90 to the proper receive and transmit channels.

Also within a wireless environment 90 is an input device 106 which may include a microphone, a touch screen display, keyboard or other mechanism for accepting information from a user, or from another external device. Regardless of the source of incoming information that needs to be transmitted, a control unit within the transmitter 92 receives a signal and relevant data from processor 100. The control unit formulates and prepares the data for transmission, using an RF transmitter, the duplexer 98 and the antenna 96. The duplexer 98 operates as a switch allowing alternate connections to the antenna 96 by the receiving circuitry 94 and the transmitting circuitry 92. On the receiving side, incoming signals are received, filtered and then processed by the receiver circuitry. The receiver circuitry in conjunction with the processor 100 then may cause information in the form of signals or data to be sent to the audio generator 118, the display 104, or other components of the wireless environment 90.

It should be noted that the RF carrier with modulation that is transmitted back and forth in wireless environment 90, also can be modulated with speech data or other control signals.

System and Method for Personalizing a Home Page

The present invention is directed to a system and method in a computing environment for integrating, populating and customizing the content of a home page associated with accessing information on a network. The personal and customizable system of the present invention involves the creation of links, page frames and informational screens, as well as facilitates access thereto.

A preferred embodiment of the present invention includes many features which are not found in conventional home page personalization products, including the ability to incorporate user-selected Uniform Resource Locators (URLs) into a home page itself and the simultaneous launching of multiple, pre-selected applications. Home page differentiation among users of the same provider is improved and access to user defined groupings of web pages is facilitated from any network accessible device.

By way of example and not limitation, FIGS. 4–9 illustrate exemplary screen shots of a preferred embodiment of the present invention. It will be understood and appreciated by those of skill in the art that the screens depicted in FIGS. 4–9 are not intended to in any way limit the present invention and are shown herein merely for ease of description. Variations on the appearance and layout of the screens shown are contemplated to be within the scope hereof.

Figure 4:
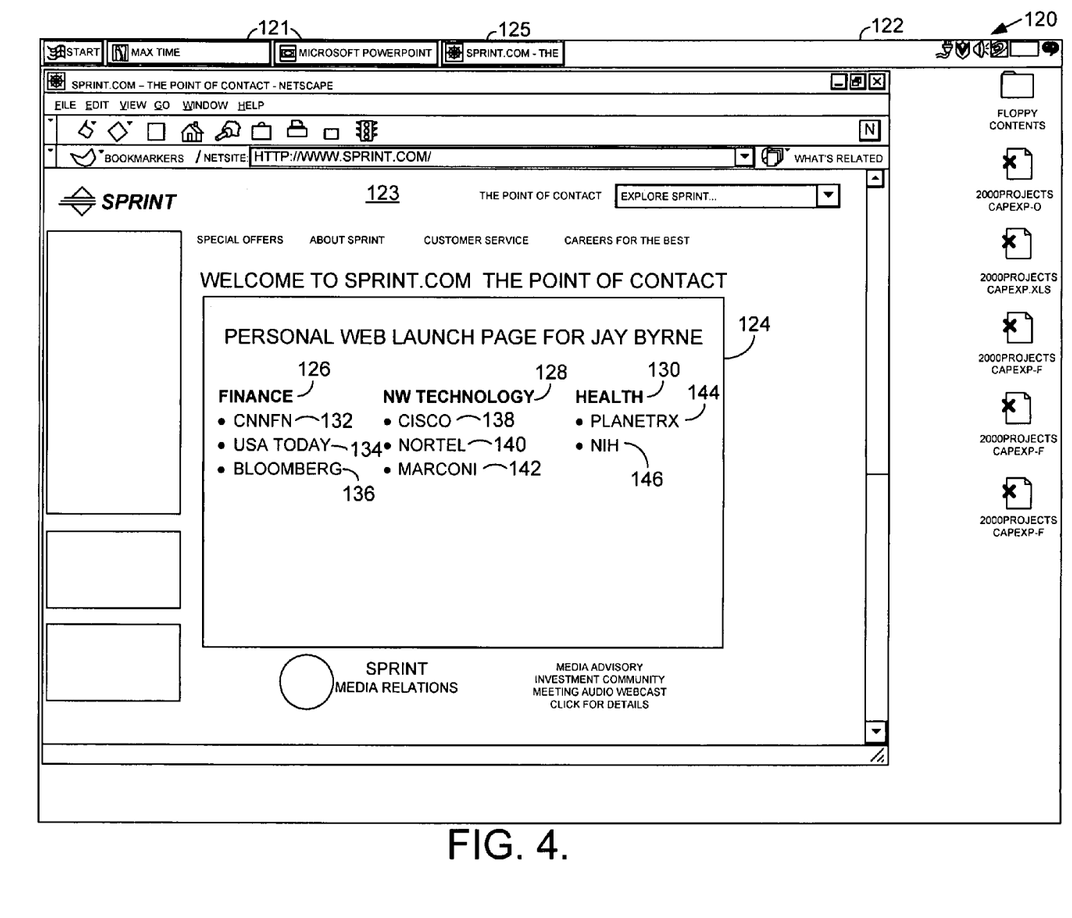
FIG. 4 is a user screen shot illustrating an exemplary computing environment wherein a typical browser window is open.

FIG. 4 illustrates an exemplary screen shot of a network computing environment wherein a typical browser window is open. The entire computer screen area is designated by reference numeral 120 and contains, among other items, a task bar 122, a series of program icons 121 and a browser application window 123. As will be understood by those skilled in the relevant art, the task bar 122 provides, among other features, a visual indication of applications or tasks which may be running either in the foreground or the background. Running applications or tasks generally are indicated within the task bar by a button or program icon 121 which may be referred to as a "task item" icon. For example, the task bar 122 in FIG. 4 contains a task item icon for an application entitled "MaxTime", a task item icon for an application entitled "Microsoft Power Point" and a task item icon for an application entitled "Sprint.com". As will be understood by those of skill in the art, all three applications for which there is a task item icon are simultaneously running in the computing environment of FIG. 4. However, the "Sprint.com" task item icon is illustrated by an icon background of a lighter color shade indicating that it is the application which is running in the foreground. The other two task item icons having an icon background of a darker color shade, while still running, are doing so in the background.

The "Sprint.com" task item icon is indicative of a browser application according to the present invention. As this application is running in the foreground, it is associated with browser application window 123. Browser application window 123 illustrates a typical web page, which, in this case, is the hypothetical home page of the user.

As with most any web page, the home page of FIG. 4 provides text and other displayed graphics as well as a number of links to other web sites. Of particular importance with regard to the present invention is the launching area 124 entitled "Personal Web Launch Page". The system and method of the present invention provide a means by which a user may configure and customize launching area 124. The present invention provides a user, with or without any technical savvy, with the ability to dynamically alter the appearance and behavior of their home page by specifying individual links to URLs of interest and assembling such links into meaningfully labeled groups, as more fully described below.

To initiate the personalization system and method of the present invention, a user first accesses the hosting web site by typing in, or otherwise accessing, the URL associated with the site. In the example of FIG. 4, the URL of the hosting web site is "Sprint.com". Subsequently, the server searches for a predefined cookie, a concept well known to those of skill in the art. If the server is able to locate a predefined cookie associated with the user, a browser application window 123 is displayed wherein launching area 124 is configured, as more fully described below. However, if the server is unable to locate a predefined cookie, the user is presented with a link to an edit page which will permit the user to configure launching area 124. Configuration of launching area 124 is facilitated by providing a screen wherein descriptive entries can be entered and associated with specific URLs or applications. The descriptive entries are typically of a format that is meaningful to the user and aids the user in relating to or identifying the associated URL. For examples, a descriptive text of 'USA Today' 134 is associated with a URL of 'www.ussatoday.com', the home page for the USA Today publication. As would be appreciated by those skilled in the art, there are a number of ways to locate, select and associate a URL with text. Any of these methods of creating linked text are contemplated and within the scope of the present invention. For example, when a web page is opened, a 'save as' command or command button can allow its URL to be saved. A URL can also be typed in, pasted in or selected from a list of choices. In some cases initial system defaults could provide the URL. The configuration of the present invention further allows a user to associate time periods with each descriptive entry or group of entries. In other words, the time periods when particular text descriptions will be displayed in the launching area 124 can be specified by the user.

Further, the configuration method of the launch area provided within the present invention is accessible from any location with a connection to the server(s) where the personalization service information resides. As will become apparent upon reading the following description, from the edit page, the user will have the option to choose the name of one or more grouping indicators and to chose one or more URLs which will be contained within each grouping and associated therewith. Upon completion of such selections, the user will be permitted to exit the edit page and will be presented with a browser application window such as that illustrated by reference numeral 123 in FIG. 4, with launching area 124 configured according to the selections made from the edit page.

Whether accessed by virtue of a predefined cookie or by configuration through the edit page, the hypothetical home page of FIG. 4, contains three grouping indicators in launching area 124. These grouping indicators are entitled Finance 126, NW Technology 128 and Health 130. A number of hyper-linked or text items provide association with URLs contained within each grouping which correspond thereto. For instance, the grouping indicator Finance 126 contains hyper-linked items for the URLs for CNNfn 132, USA Today 134 and Bloomberg 136. The grouping indicator NW Technology 128 contains hyper-linked items for the URLs for Cisco 138, Nortel 140 and Marconi 142. And grouping indicator Health 130 contains hyper-linked items for the URLs for PlanetRX 144 and for NIH 146. A hyper-linked or text item is an electronic indicia providing direct access from one distinctively marked location in a document or on a screen to another distinctively marked location in either the same document or a different document. Each hyper-linked item also may create an event or signal that can be detected by underlying software code in order to generate a desired response or to cause a particular action to be taken. From launching area 124, the user is thus able to link to a number of different applications, each related to a predefined area of interest and grouped accordingly for ease of access by the user. This grouping of related information is utilized in the system and method of the present invention for simultaneously displaying multiple frames/windows, as more fully described below.

Figure 5:
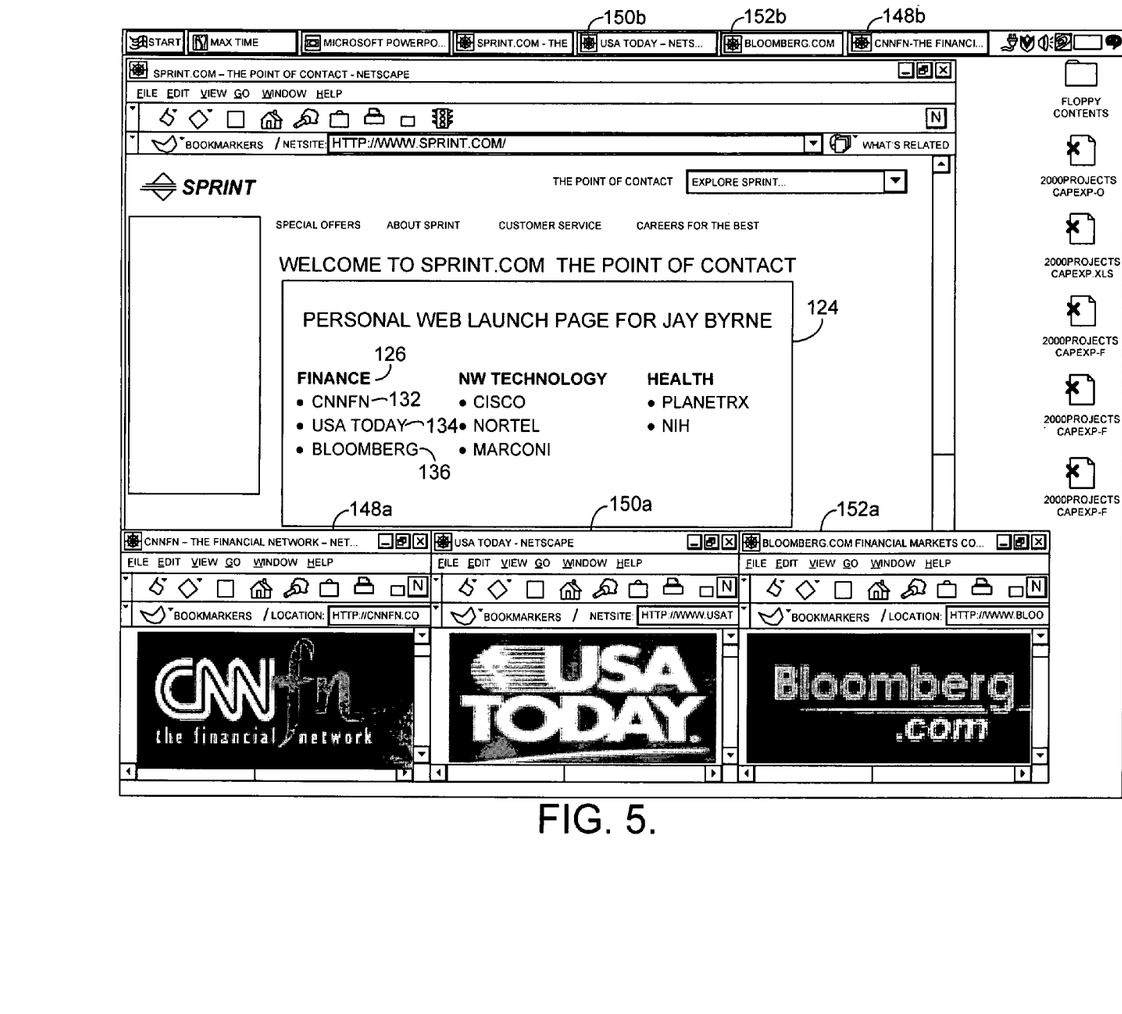
FIG. 5 is a user screen shot illustrating an exemplary computing environment wherein multiple browser windows are open.
Figure 6:
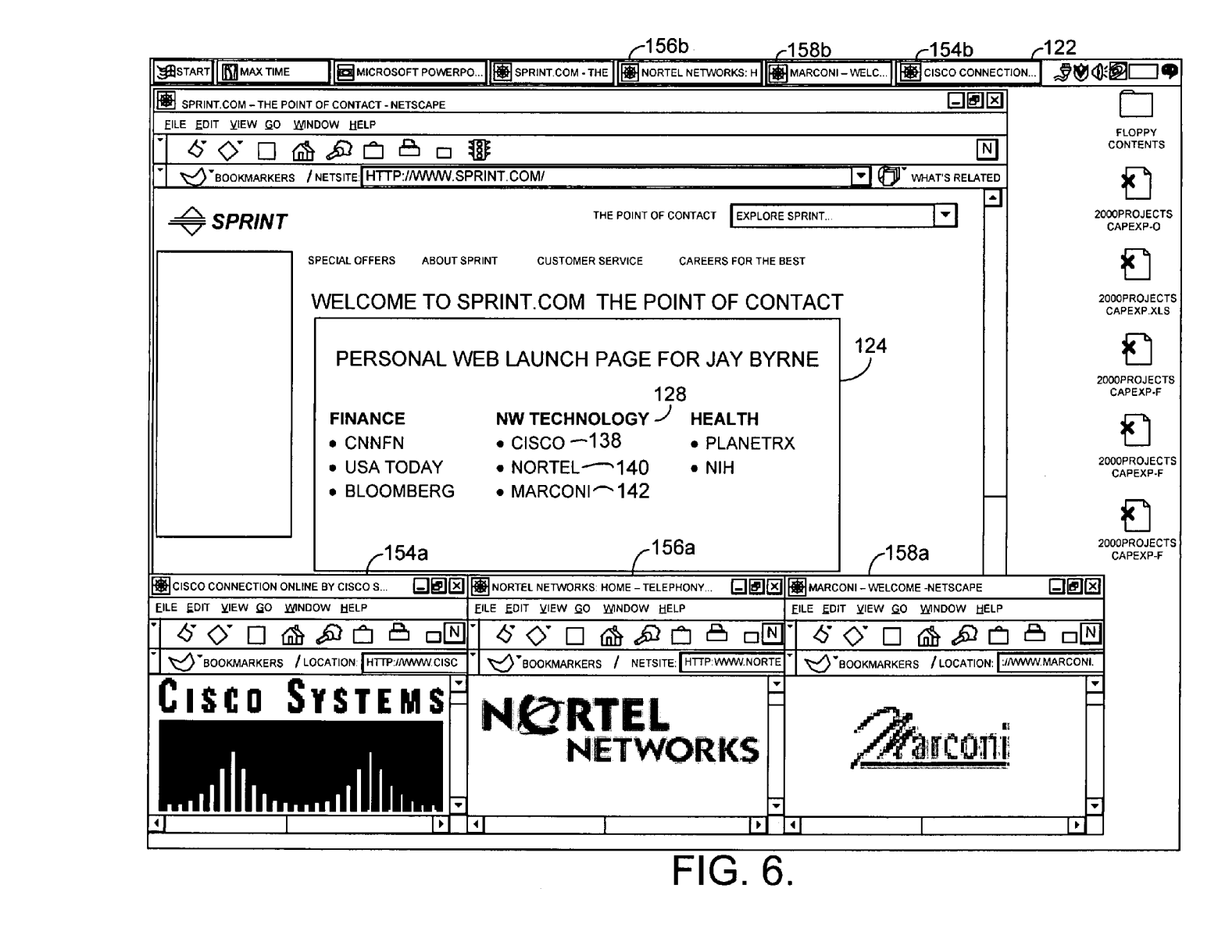
FIG. 6 is a user screen shot illustrating a user's selection of a particular topic heading of FIG. 5.

As previously stated, the hypothetical home page of FIG. 4 contains three grouping indicators in launching area 124, each grouping indicator containing a number of hyper-linked items associated therewith, each of which is associated with URLs of interest to the user. If the user desires to view the configured information regarding a particular grouping indicator, he or she selects the grouping indicator of interest. For instance, imagine that the hypothetical user wishes to view the information associated with the grouping indicator Finance 126. He/she would select Finance 126 and the appearance of screen 120 would be altered to show that which is illustrated in FIG. 5. As is evident, FIG. 5 illustrates an exemplary screen shot having multiple open browser windows 148a, 150a and 152a. In accordance with the system and method of the present invention, in response to the user's selection, each application or site (i.e., information page) associated with the hyper-linked items contained within the selected grouping heading is launched and displayed in a frame-enabled window. Thus, in the example of FIG. 5, a window containing the information page associated with CNNfn 148a, a window containing the information page associated with USA Today 150a and a window containing the information page associated with Bloomberg 152a simultaneously are opened and displayed in response to the user's selection of the Finance grouping indicator 126. While the functions described herein are with reference to groups, it will be appreciated by those skilled in the art that grouping is optional and much like file folders or directories, it is a convenience feature.

As previously stated, not only are the information pages for the hyper-linked items displayed in frame-enabled windows on screen 120 but the application associated with each hyper-linked item is simultaneously launched. This is indicated by the presence of a task item icon in task bar 122 which is associated with each open application. In other words, there is a task item icon corresponding to CNNfn 148b, a task item icon corresponding to USA Today 150b and a task item icon corresponding to Bloomberg 152b. The individual windows that are opened allow continuous and simultaneous display without any cumbersome effort on the part of a user.

It should be noted that the display of the frame-enabled web pages relating to a particular group of individual links is in no way limited by the system and method of the present invention, but rather by the limitations of the hardware and operating system environment utilized. In other words, it is theoretically possible to have an unlimited number of applications launched at one time, such being limited by the environment in which the present invention is operating.

Imagine now that the hypothetical user, rather than viewing the information pages associated with the Finance grouping indicator 126, wishes to view those associated with the NW Technology grouping indicator 128. The user selects the NW Technology grouping indicator 128 and the appearance of screen 120 changes to that illustrated in FIG. 6. As is evident, a frame-enabled window is displayed for each of Cisco 154a, Nortel 156a and Marconi 158a, the hyper-linked text items contained within the NW Technology grouping indicator 128. As with the previous example, the applications associated with each hyper-linked text item are simultaneously launched, as indicated in task bar 122 by task item icons 154b, 156b and 158b. An examination of the task bar also reveals that the applications associated with the previously opened applications (i.e., those associate with grouping indicator Finance 126) have been closed.

Figure 7:
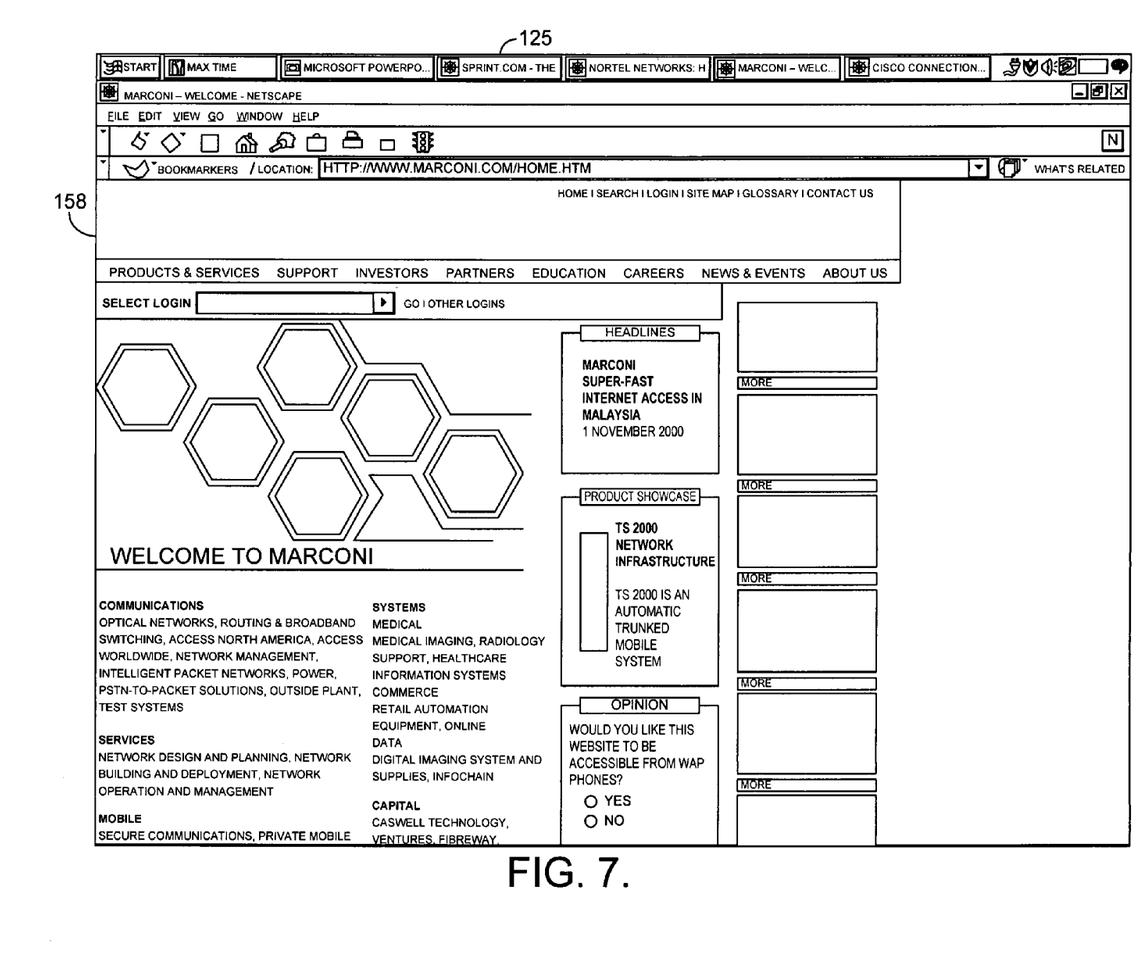
FIG. 7 is an exemplary user's screen shot illustrating maximization of a particular application chosen from the windows of FIG. 6.

An additional feature of the present invention is illustrated in the screen shot of FIG. 7. Each frame-enabled window or instance of the browser may be maximized by the user as desired, without affecting the other windows. For instance, in the screen shot of FIG. 7, the hypothetical user has chosen to maximize the window associated with the Marconi 158 application resulting in the Marconi window 158 dominating the viewing area of screen 122. The task bar area 122 illustrated in FIG. 7, indicates that all the frame-enabled windows and instances of the browser associated with the other hyper-linked items contained within grouping indicator NW Technology 128 still are current and accessible at the user's discretion by the task switching process of the operating environment. Such process is well known to those of skill in the art and will not be discussed further herein.

Figure 8:
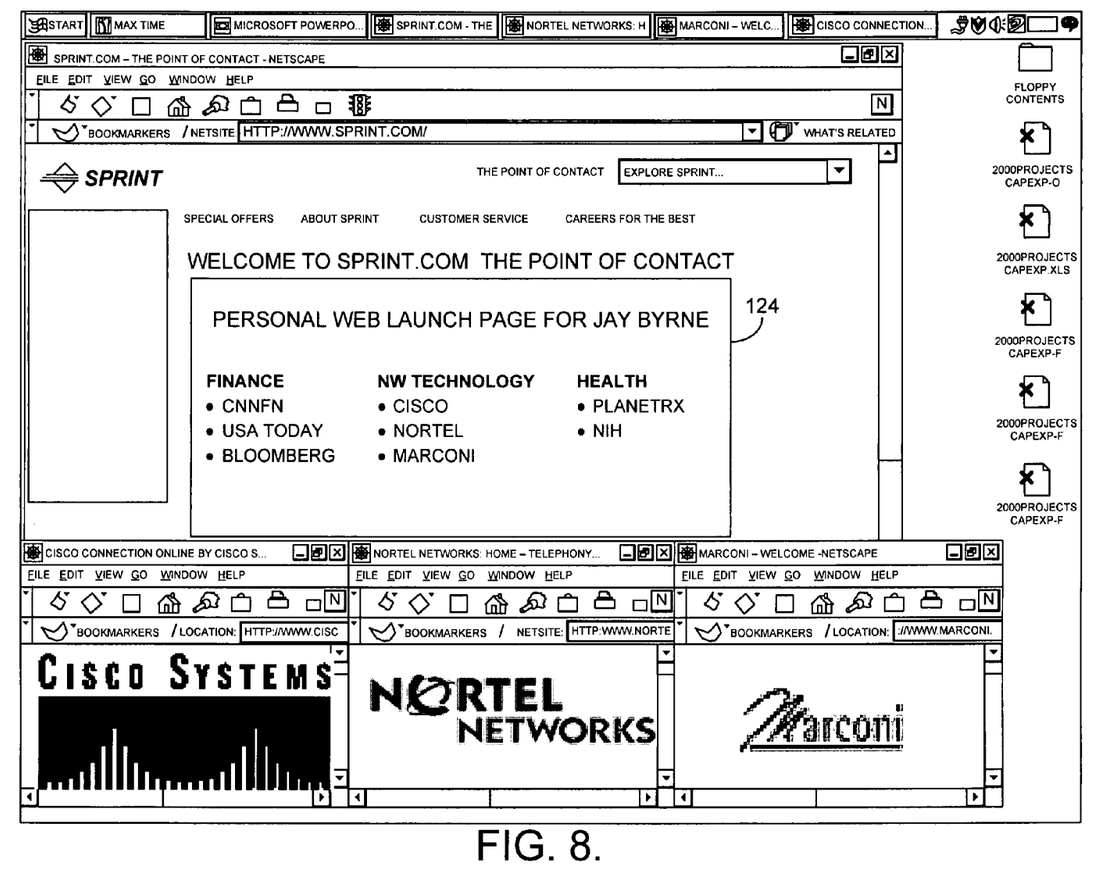
FIG. 8 is an exemplary user's screen shot illustrating reversion upon minimization of the window of FIG. 7.

Once the user has completed his or her viewing of the maximized Marconi application, the window 158 may be returned to its original displayed state as shown in FIG. 8. The same result may be achieved upon selection of the home page task item icon (i.e., Sprint.com 125) from the task bar 122. As is evident, the screen appearance of FIG. 8 is identical to that of FIG. 6 indicating a reversion upon minimization of the Marconi window 158.

Figure 9:
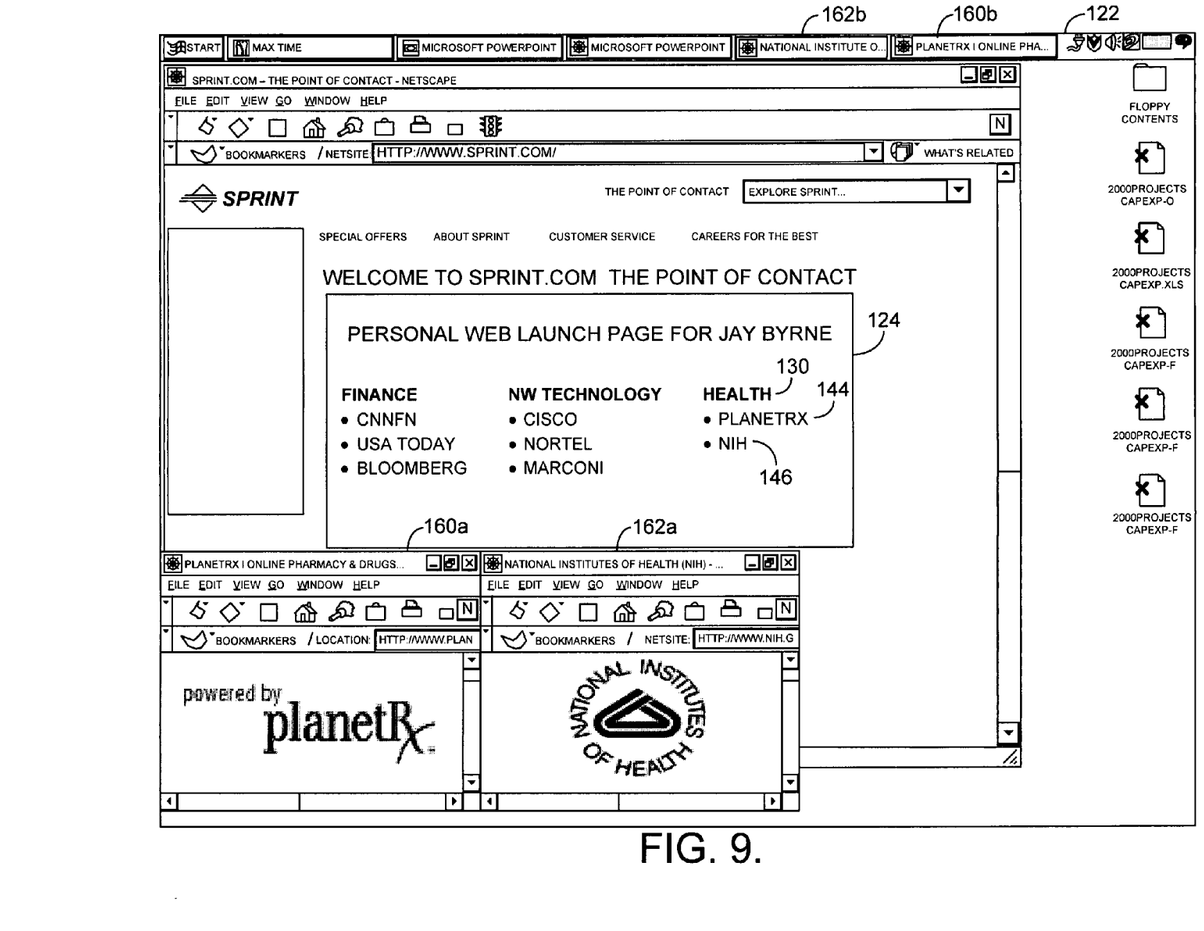
FIG. 9 is an exemplary user's screen shot illustrating an alternative user's selection of a particular topic heading of FIG. 5.

A further example of the method of the present invention is shown in the illustrative screen shot of FIG. 9. In this case, the hypothetical user has selected the Health grouping indicator 130, resulting in the display of frame-enabled windows corresponding to the individual links within that group. A PlanetRX window 160a is displayed, as is a NIH window 162a. Again, as is evident from the task bar, each of the windows represents a launched application, each site indicated by a task item icon 160b, 162b. This example illustrates a further feature of the method of the present invention. The quantity of windows and links are dynamically controlled based upon the user's configuration choices and are in no way limited by any aspect of the present invention. The number of hyper-linked items within each grouping is limited only by the hardware and operating environment utilized and does not need to be static between groupings.

The configuration of the hypothetical user's home page discussed thus far and shown in the browser window 123, particularly the configured groupings and links of the personal launch area 124, are stored between user sessions. As such, this configured information may be ported between computing environments in any of the number of manners known to those of skill in the relevant art. For example, this may be accomplished through the use of cookies, server stored files or the like. This flexibility allows the user to attain a consistent experience between sessions and across interactive devices.

An additional aspect of the present invention provides the user with the ability to configure personal launch area 124 for dynamic time-based groupings and links. In other words, the information that is displayed within launch area 124 may be configured to vary depending on the time of day that the user accesses the home page. For example, assume that financial information would not be needed by the user between four o'clock in the evening and nine o'clock in the morning. Accordingly, the user will probably not want the Financial grouping 126 displayed during that time period. The present invention, as previously mentioned, allows the user to configure launch area 124 to exclude the display of Financial grouping 126 and only display the other two groups during a specified time period. The present invention also allows a similar configuration of particular links within each displayed group. Such configuration choices are made through the edit page upon initial configuration of the launch area 124 or at any time thereafter as desired.

In summary, a method and system of customizing and personalizing a home page is provided herein. The present invention provides to its users a significant operational advantage in the area of viewing, accessing and controlling information that is available from their home page. It also improves speed and simplifies access to desired applications by freeing the user from ISP selected sites and permitting the grouping and simultaneous opening of multiple sites. The present invention further provides increased portability of a user experience from one computing access environment to another.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects herein above set forth together with other advantages which are obvious and which are inherent to the system and method. It will be understood that certain features and sub-combinations are of utility and may be employed without reference to other features and sub-combinations. This is contemplated by and is within the scope of the claims.

The invention claimed is:

1. One or more tangible computer-readable media having computer-useable instructions embodied thereon for performing a method of providing a personalized network-browsing experience, the method comprising:

providing on a network-browsing page one or more selectable headings, wherein each of said selectable headings is associated with a set of one more user-defined subheading links that each link to respective information pages, and wherein at least a portion of said one or more subheading links are dynamic and time-sensitive such that they may be defined differently according to different times of a day; and in response to selecting one of said selectable headings, automatically launching a set of windows that are contemporaneously viewable with said network-browsing page, and wherein each of said windows respectively displays one of said information pages.

2. The media of claim 1, wherein each subheading link is associated with one or more of a web page, an avatar and an audio file.

3. A computer system having a processor, a memory and an operating environment, the computer system operable to employ the media recited in claim 1.

4. The media of claim 1, wherein defining said links differently according to different times of a day includes configuring one or more of said subheading links to display text and to link to certain information pages during certain periods of time and display other text and link to other information pages during other periods of time.

5. The media of claim 1, wherein said subheading links are hierarchical thereby permitting the simultaneous display of sub-links of each subheading link in a separate window.

6. One or more tangible computer-readable media having computer-useable instructions embodied thereon for performing a method for personalizing access to information on a network, the method comprising:

enabling the configuration of a set of subheading links that each correspond to an information page and that each are to be presented on a first page, wherein at least a portion of said set of subheading links are dynamic and time-sensitive such that they may be defined differently according to different times of a day;

enabling the configuration of a first selectable heading, whereby selecting said first selectable heading spawns a set of windows that each respectively corresponds to one or said information pages; and wherein said set of windows will be contemporaneously viewable with said first page.

7. A computer system having a processor, a memory and an operating environment, the computer system operable to execute the instructions of claim 6.

8. One or more tangible computer-readable media having computer-useable instructions embodied thereon for performing a method of customizing a browser page on a network, wherein said personalized browser page is remotely accessible by a user, the method comprising:

providing a browser page having a user configurable area;

storing one or more individual links, each said individual link providing a connection to an information page accessible from the network, wherein each said individual link is defined by the user, and wherein at least a portion of said one or more individual links is dynamic and time-sensitive such that they may be defined differently according to different times of a day;

populating said configurable area with a set of indicia upon initiation of the browser page from a network accessible device, wherein each indicium in said set corresponds to one of said individual links; and displaying, simultaneously with said browser page, a series of windows, wherein each window displays said information page that corresponds to one of said individual links.

9. The media of claim 8, further comprising storing one or more groups of links, each said group containing at least one of said individual links, wherein each said group is defined by said user, and wherein said series of windows displayed with said home page corresponds to said individual links contained in one of said groups.

10. A computer system having a processor, a memory and an operating, the computer system operable to execute the instructions of claim 8.

11. A system for use in a computing environment for personalizing access to information on a network, the system comprising:
a browser page having an area which is configurable by a user; and
one or more individual links, each said individual link providing a connection to an information page accessible from the network, wherein each individual link is defined by said user, wherein said configurable area is populated with one or more of said individual links, and wherein a series of windows is displayable simultaneously with said browser page, and wherein each window includes said information page that corresponds to one of said individual links and wherein at least a portion of said one or more individual links are dynamic and time-sensitive such that they may be defined differently according to different time of a day.

12. The system as recited in claim 11, further comprising one or more groups of links, each group includes at least one of said individual links, wherein each group is defined by said user, and wherein said series of windows displayed with said home page corresponds to said individual links contained in one of said groups.

* * * * *